March 31, 1942. W. C. JACKSON 2,277,666
SPLASH GUARD
Filed June 28, 1940
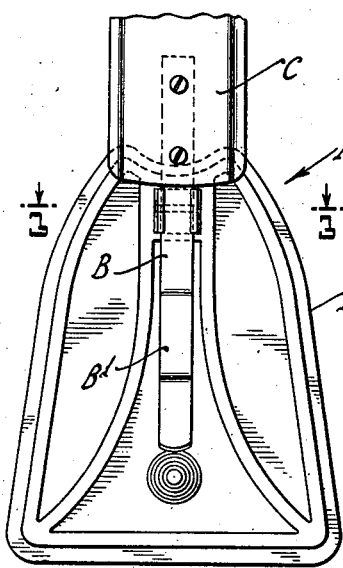
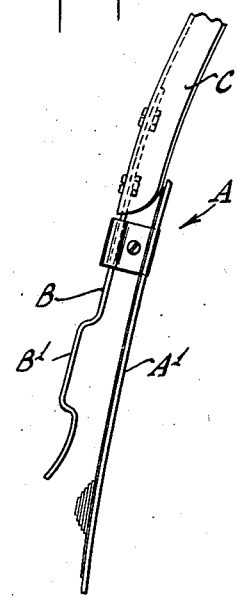
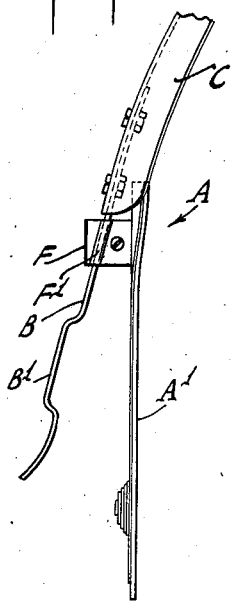
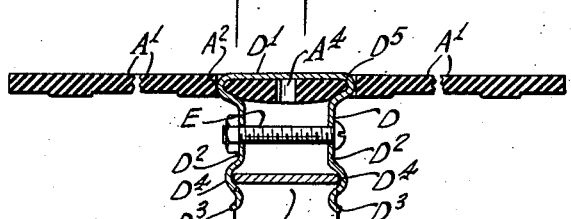
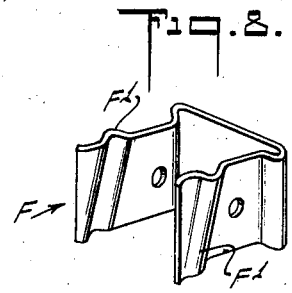
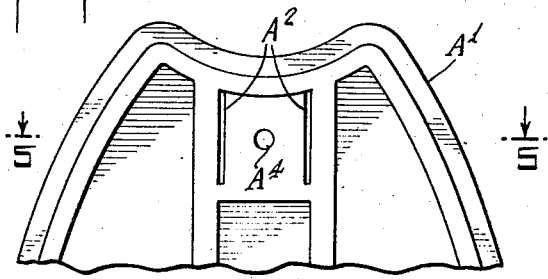
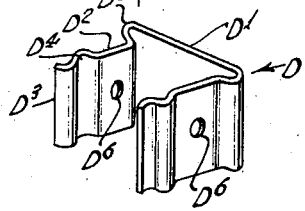
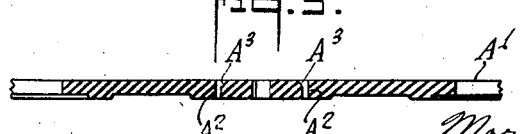
INVENTOR
Walter C. Jackson
BY
Morrison, Kennedy & Campbell
ATTORNEYS Patented Mar. 31, 1942

2,277,666

UNITED STATES PATENT OFFICE 2,277,666

SPLASH GUARD

Walter C. Jackson, Rahway, N. J., assignor to Tingley-Reliance Rubber Corporation, a corporation of New Jersey Application June 28, 1940, Serial No. 342,948

13 Claims. (Cl. 280—154.5)

This invention relates to bicycle or motorcycle fender splash guards of the type adapted to be attached to a stand holding clip depending from the lower end of the fender at the rear. More specifically, the present improvements deal with devices whereby the splash guard may be readily attached to the clip.

A splash guard of the type to which the present improvements are directed, consists usually of a flexible apron together with a clamp centrally located near the top thereof, the clamp acting to grip the edges of the stand holding clip so that the splash guard is securely fastened in place. Where such clamps have been made of metal they have been secured to the apron by means of an ordinary bolt and nut, the bolt passing through the clamp and apron in the direction of the vehicle wheel, and the nut threaded on the end of the bolt and screwed up tightly in place. That method of attachment, however, presents numerous difficulties. For instance, if the bolt is too long there is the danger that it will come in contact with the vehicle wheel, particularly since very little clearance is provided between the periphery of the wheel and the stand holding clip. On the other hand, if the bolt is too short, it is difficult to avoid detachment and loss of the apron, since the swiveling action permitted by such a connection results in a loosening of the nut.

According to the present improvements, the disadvantages just mentioned are obviated by using a U-shaped metal clamp, the legs of which pass through vertical slots formed in the apron near the top thereof and symmetrically disposed with respect to the vertical center line of the apron. The base of the U-shaped clamp engages the rear surface of the apron, i. e., the surface facing the wheel; and adjacent the base of the clamp, there is provided a pair of opposed recesses into which the edges of that portion of the apron intermediate the slots tightly engage. According to this arrangement, not only is the apron prevented from swiveling or turning with respect to the clamp, but, in addition, any movement of the apron toward or away from the stand holding clip is effectively prevented. Furthermore, since the base of the clamp is substantially flush with the rear face of the apron adequate clearance is provided between the splash guard assembly and the periphery of the vehicle wheel.

At their outer ends, the legs of the clamp are flared to facilitate its being snapped in place on the stand holding clip. The flaring of the legs also serves an additional function in assembly.

Thus, since the portion of the apron between the slots is somewhat wider than the distance between the main portions of the clamp legs, it will be apparent that by flaring the legs of the clamp to a dimension substantially equal to the distance between the apron slots, the insertion of the legs through the slots will be greatly facilitated. Just rearwardly of the flared ends, the clamp is formed with a pair of opposed recesses or grooves adapted to receive the edges of the stand holding clip. Between these recesses and the apron, the legs are drilled to receive a transverse bolt by means of which the legs can be drawn inwardly so as tightly to engage the edges of the stand holding clip when the splash guard assembly is placed in service.

In another embodiment of the invention, the legs of the clamp are formed with recesses or grooves adapted to receive the edges of the stand holding clip and which are disposed at an angle with the vertical, the angle being such that when the splash guard assembly is in place, the attached apron will hang substantially vertically and will be located closer to the fender than is usually the case.

Referring to the drawing:

Fig. 1 is a view in elevation of a splash guard embodying the present improvements and which is shown attached to a stand holding clip depending from the rear fender of a bicycle;

Fig. 2 is a side elevation of the splash guard assembly shown in Fig. 1;

Fig. 3 is an enlarged horizontal sectional view on line 3—3 of Fig. 1;

Fig. 4 is a view in elevation of a portion of the apron prior to the assembly of the clamp therewith;

Fig. 5 is a horizontal sectional view on line 5—5 of Fig. 4;

Fig. 6 is a perspective view of the U-shaped clamp shown in Fig. 3;

Fig. 7 is a side elevation similar to Fig. 1, but showing a splash guard assembly utilizing a clamp wherein the recesses which receive the stand holding clip are located at an angle with the vertical; and Fig. 8 is a perspective view of the clamp shown in Fig. 7.

As shown in Figs. 1 and 2, the fender splash guard A is attached in service to a bicycle stand retaining clip B which, as is the custom, is secured to the rear fender C of a bicycle. The clip B is mounted on the inside of the fender C, i. e., the side adjacent the vehicle wheel, in any suitable manner, as by riveting or bolting, and extends below the lower edge of the fender where it is bent, as at $B^1$, to receive the stand (not shown).

The splash guard A, at its upper end, fits beneath the fender C and is snapped on to the stand holding clip B from the rear of the latter so that when the guard is in place it rests behind the clip, i. e., between it and the wheel.

Preferably the splash guard includes a flexible vulcanized rubber apron $A^1$ having the holding means, by which it is secured to the clip B, located in its upper central portion.

The holding means, in part, includes a U-shaped clamp D of resilient material, preferably metal, and formed with a base portion $D^1$ and two leg portions $D^2$ (Figs. 3 and 6). At their outer ends, the leg portions $D^2$ are flared, as at $D^3$, to facilitate their being snapped upon the stand holding clip and, just inwardly of the flaring portions, said legs are provided with a pair of opposed vertical recesses or grooves $D^4$ located one in each of the clamp legs and wherein the stand holding clip engages at its opposite edges when the splash guard is placed in service.

Near its top, the apron $A^1$ (Figs. 4 and 5) is formed with a pair of vertical slots $A^2$, disposed symmetrically with regard to the vertical center line of the apron, and which are as long as the clamp D is wide. The apron is somewhat thicker in that portion thereof which contains the slots so as to provide sufficient rubber stock adequately to retain the clamp. One apron with which the present invention has been used is formed with an embossed design and the overall thickness of the stock in the embossed region has been found sufficient for the purpose. Of course, in the absence of any embossing, a suitable thickness of stock will be used. At the rear of the apron, the slots are bevelled along their inner edges, as at $A^3$, for a purpose hereinafter described.

The splash guard A is assembled by inserting the ends of the legs $D^2$ through the apron slots $A^2$ from the rear and when the clamp is in place, the base portion $D^1$ thereof will be substantially flush with the rear surface of the apron. The distance between the slots $A^2$ is somewhat wider than the distance between the legs of the clamp but this presents no difficulty in assembly since one leg of the clamp can be inserted first through one slot, thereby disposing the apron at an angle with respect to the clamp, and when that leg of the clamp has been pushed through the slot sufficiently far to cause the outer end of the other leg to align with its slot, both legs of the clamp can be pushed through the respective slots until the parts are in their final relative positions as shown in Fig. 3.

The reason for spacing the slots $A^2$ in the apron A wider than the distance between the legs $D^2$ of the clamp will now be apparent. It will be observed that adjacent the base $D^1$ of the clamp, the legs $D^2$ bulge outwardly so as to present a pair of opposed recesses or grooves $D^5$, and when assembly is completed, that portion of the apron between the slots will completely fill up the space between the bottoms of said recesses. Furthermore, the presence of the bevelled edges $A^3$ hereinbefore mentioned, will produce a snug fit without, however, excessively distorting the rubber stock. With this arrangement, not only will the apron be anchored against movement outwardly along the legs $D^2$ of the clamp, but in addition, no relative swiveling action between the clamp D and the apron $A^1$ will be permitted.

As shown in Fig. 3, the legs $D^2$ of the clamp, between the apron $A^1$ and the recesses $D^4$ which accommodate the stand holding clip, are drilled with holes $D^6$ to receive a transversely located bolt E, the head of which engages the outer surface of one leg and the nut, the outer surface of the opposite leg. In order to place the splash guard assembly in service, it is necessary, only slightly to unscrew the bolt E, snap the clamp D over the holding clip B, and then tighten up on the bolt until the clamp engages the edges of the clip with sufficient friction to prevent slippage. Of course, it will be understood that the assembly of the clamp with the apron is accomplished before the bolt is inserted in place.

Some bicycles and motorcycles are devoid of a stand holding clip B. In such cases, however, the fenders are drilled so that a splash guard can be attached directly thereto. For this purpose, the apron is provided with a hole $A^4$ for direct attachment by means of a bolt, it being understood that in such cases the clamp will be removed from the apron. The removal procedure is just the reverse of the procedure hereinbefore described in conection with assembling the parts.

The embodiment of the invention shown in Figs. 7 and 8 is in all respects the same as that hereinbefore described except that there is provided a clamp F formed with clip receiving recesses or grooves $F^1$ disposed at an angle with respect to the vertical. Usually, the stand holding clips are similarly disposed so that, when a splash guard assembly of this character is attached to the clip, the apron will hang vertically. Furthermore, the apron, at its upper end, will be located nearer the crown of the fender than in the embodiment previously described. Such an arrangement will have a good appearance, will provide sufficient clearance between the splash guard and the wheel of the vehicle, and also will give greater clearance between the apron and the holding clip itself, thereby avoiding any possibility of interference with the stand as it is swung up into place for engagement by the clip.

In the accompanying drawing, the invention has been shown merely in preferred form and by way of example, but obviously many variations and modifications may be made therein which will still be comprised within its spirit. It is to be understood, therefore, that the invention is not limited to any specific form or embodiment, except insofar as such limitations are specified in the appended claims.

Having thus described my invention, what I claim is:

1. A fender splash guard adapted to be secured to a stand holding clip depending from the fender and including, in combination, a flexible apron and means for securing the apron to the clip, said means comprising an integral device having two legs presenting grooves wherein the edges of the clip engage, said device being secured to the apron in such manner that the two legs thereof which engage the clip emerge perpendicularly from a surface of the apron.

2. A fender splash guard adapted to be secured to a stand holding clip depending from the fender and including, in combination, a flexible apron and means for securing the apron to the clip, said means comprising an integral device having two legs presenting grooves wherein the edges of the clip engage, said legs passing through slots formed in the apron and emerging perpendicularly from one surface thereof for engagement with the clip.

3. A fender splash guard adapted to be secured to a stand holding clip depending from the fender and including, in combination, a flexible apron and means for securing the apron to the clip, said means comprising an integral clamp having a base portion and two leg portions presenting grooves wherein the edges of the clip engage, said clamp being secured to the apron in such manner that said leg portions emerge from a surface of the apron in a direction substantially perpendicular thereto whereby relative movement between the clamp and the apron is prevented solely by the interaction of the clamp and the apron material, and means for drawing the leg portions toward each other to augment their gripping action on the clip.

4. A fender splash guard adapted to be secured to a stand holding clip depending from the fender and including, in combination, a flexible apron and means for securing the apron to the clip, said means comprising a clamp having a base portion and two leg portions, the leg portions passing through slots formed in the apron and in a direction substantially perpendicular to the apron face adjacent the clip whereby the apron is secured to the clamp, grooves arranged in the leg portions for receiving the edges of the clip, and means for drawing the leg portions toward each other to augment their gripping action on the clip.

5. A fender splash guard adapted to be secured to a stand holding clip depending from the fender and including, in combination, a flexible apron and means for securing the apron to the clip, said means comprising a clamp having a base portion and two leg portions passing through spaced slots formed in the apron whereby the latter is secured to the clamp, and said clamp presenting recesses adjacent said base portion for receiving the edges of that portion of the apron located between the slots.

6. A fender splash guard adapted to be secured to a stand holding clip depending from the fender and including, in combination, a flexible apron and means for securing the apron to the clip, said means comprising a U-shaped clamp having a base portion and two spaced leg portions passing through slots formed in the apron, said slots having a greater spacing than the leg portions, and said clamp presenting opposed recesses adjacent said base portion to accommodate the width of apron material between the slots.

7. A fender splash guard adapted to be secured to a stand holding clip depending from the fender and including, in combination, a flexible apron and means for securing the apron to the clip, said means comprising a U-shaped clamp having a base portion and two spaced leg portions passing through slots formed in the apron, said slots having a greater spacing than the leg portions, said clamp presenting opposed recesses adjacent said base portion to accommodate the width of apron material between the slots, and said slots each being formed in one edge thereof so as more readily to fit into said recesses.

8. A fender splash guard adapted to be secured to a stand holding clip depending from the fender and including, in combination, a flexible apron and means for securing the apron to the clip, said means comprising a clamp having a base portion and two leg portions, the leg portions passing through slots formed in the apron a distance sufficient to present the base portion in close proximity to one surface of said apron and extending perpendicularly beyond the other surface of the apron, said legs presenting opposed grooves adjacent their ends to receive the edges of the clip and means for drawing the legs toward each other to augment their gripping action on the clip.

9. A fender splash guard adapted to be secured to a stand holding clip depending from the fender and including, in combination, a flexible apron and means for securing the apron to the clip, said means comprising a U-shaped clamp secured to the apron and having a pair of legs extending perpendicularly thereto and adapted to engage the edges of the clip, said legs being formed with outwardly flaring ends to facilitate a snap engagement with the clip and presenting opposed recesses in which the opposite edges of the clip are received and means for drawing the legs toward each other to augment their gripping action on the clip.

10. A fender splash guard adapted to be secured to a stand holding clip depending from the fender and including, in combination, a flexible apron and means for securing the apron to the clip, said means comprising a U-shaped clamp secured to the apron and having a pair of legs extending perpendicularly thereto and presenting opposed recesses in which the opposite edges of the clip are received, said recesses being disposed at an angle with the vertical.

11. A fender splash guard adapted to be secured to a stand holding clip depending from the fender and including, in combination, a flexible apron and means for securing the apron to the clip, said means comprising a U-shaped clamp secured to the apron and having a pair of legs extending perpendicularly thereto and presenting opposed recesses in which the opposite edges of the clip are received, said recesses being disposed at an angle with the vertical, and means for drawing the legs toward each other to augment their gripping action on the clip.

12. A splash guard according to claim 5 wherein the leg portions present opposed grooves to receive the edges of the clip and wherein means are provided for drawing the legs toward each other to augment their gripping action on the clip.

13. A fender splash guard adapted to be secured to a stand holding clip depending from the fender and including, in combination, a flexible apron and means for securing the apron to the clip, said means comprising an integral clamp having a base portion and two leg portions for frictionally engaging the lateral edges of the clip, the clamp adjacent its base portion having an interlocking connection with the material of the apron, and the leg portions adjacent their outer ends being provided with means for locating the clamp in a fixed fore and aft position with respect to the clip, and means acting upon the legs of the clamp between the ends thereof and the apron for drawing the leg portions toward each other to augment their frictional engagement with the clip.

WALTER C. JACKSON.